United States Patent [19]

Kleine et al.

[11] 4,120,351
[45] Oct. 17, 1978

[54] HEAT EXCHANGE PANEL WITH IMPROVED HEADER

[75] Inventors: Charles A. Kleine, Florissant, Mo.; Verne L. Middleton, East Alton, Ill.

[73] Assignee: Olin Corporation, New Haven, Conn.

[21] Appl. No.: 632,643

[22] Filed: Nov. 17, 1975

Related U.S. Application Data

[63] Continuation-in-part of Ser. No. 573,953, May 2, 1975, and Ser. No. 632,502, Nov. 17, 1975, which is a continuation-in-part of Ser. No. 573,953.

[51] Int. Cl.² .............................................. F28F 3/14
[52] U.S. Cl. ................................... 165/170; 126/271; 165/174; 237/1 A
[58] Field of Search .................... 29/157.3 V; 62/523; 165/170, 174; 126/271; 237/1 A

[56] References Cited

U.S. PATENT DOCUMENTS

| 1,994,903 | 3/1935 | Warrender | 29/157.3 V |
|---|---|---|---|
| 2,626,130 | 1/1953 | Raskin | 62/523 |
| 2,705,948 | 4/1955 | Rostock | 126/271 |
| 2,934,322 | 4/1960 | Hazard | 165/170 |
| 3,004,327 | 10/1961 | Keith et al. | 29/157.3 V |
| 3,222,763 | 12/1965 | Heuer | 29/157.3 V |
| 3,839,975 | 10/1974 | Tranel | 29/157.3 V |
| 4,027,821 | 6/1977 | Hayes et al. | 126/271 |

FOREIGN PATENT DOCUMENTS 1,075,645  2/1960  Fed. Rep. of Germany ............ 62/523

Primary Examiner—Charles J. Myhre
Assistant Examiner—Sheldon Richter
Attorney, Agent, or Firm—Paul Weinstein

[57] ABSTRACT

A heat exchange panel possessing a system of internal tubular passageways connecting opposed headers, said headers defining an angle of at least 91° with respect to the direction of flow of heat exchange medium passing therethrough, wherein said headers are triangular in shape and wherein fluid entry and exit portions extending from said headers are provided with their longitudinal dimensions lying in substantially the same plane as one of the sides defining the outer boundaries of said headers. Said headers are further provided with a plurality of bonded portions placed in alignment so as to define discrete, parallel-directed fluid channels assisting in the distribution of heat exchange fluid. The configuration of the headers provides improved and efficient drainage of fluid from the panel.

13 Claims, 9 Drawing Figures

HEAT EXCHANGE PANEL WITH IMPROVED HEADER

CROSS REFERENCE TO RELATED APPLICATION

The present application is a continuation-in-part of co-pending applications Ser. No. 573,953, filed May 2, 1975, and Ser. No. 632,502, filed of even date herewith, which is in turn a continuation-in-part of Ser. No. 573,953.

BACKGROUND OF THE INVENTION

The present invention relates to metal panels having a system of internal tubular passageways disposed between spaced apart portions of the thickness of the panel. Said panels possess utility in heat exchange applications wherein a heat exchange medium is circulated through said passageways. A particular application of said panels resides in devices utilizing solar energy, and specifically, solar energy absorbing devices for elevating fluid temperature.

It is well known that the radiation of the sun can be collected as a source of energy for heating or cooling or for direct conversion to electricity. Heating and cooling depend upon collection of rays of solar energy in a fluid heating transfer system. The heated fluid is pumped or allowed to flow to a place of utilization for the thermal energy it has acquired.

In certain areas of the world, solar energy is the most abundant form of available energy if it could be harnessed economically. Even in more developed areas of the world, the economic harnessing of solar energy would provide an attractive alternative to the use of fossil fuels for energy generation.

One of the problems attending the development of an efficient system for the conversion of solar energy resides with the structure and design of the solar energy absorbing device, or solar collector. This solar collector generally comprises a rectangular plate-like structure possessing channels or passageways for the circulation of the energy absorbing fluid medium. Conventionally, these panels have comprised a pair of opposed expanded passageways, known as headers, which are placed at opposite ends of the panel, and are connected by a plurality of tubular passageways which are often in parallel relation with respect to each other. These passageways, as well as the headers themselves, have generally been disposed at right angles with respect to each other and in parallel relation with respect to the horizontal and vertical dimensions, respectively, of the panel.

The aforementioned configuration suffers from certain deficiencies, in that fluid flow tends to encounter pockets of stagnation which cut down on the efficient circulation of solar energy. Further, various entrained gases tend to collect in the passageways, with the result that air locks which greatly inhibit flow and reduce the maximum fluid circulation capacity of the panel are often formed.

In our co-pending application Ser. No. 573,953, the disclosure of which is incorporated herein by reference, it was determined that improved flow was obtainable by a modification of the disposition of the headers wherein the headers define an angle of at least 91° with respect to the direction of flow of the heat exchange medium. Though this modification alleviates the aforenoted problems to an extent, it was felt that further improvement in flow was desirable in certain of the panel configurations. To this end the improvements embodied in the present invention were developed.

SUMMARY OF THE INVENTION

In accordance with the present invention, a heat exchange panel is provided which possesses significantly improved fluid distribution and efficiency, and specific utility in solar energy applications.

The panel of the present invention comprises a planar structure possessing a system of tubular passageways for a heat exchange medium defining opposed headers connected by connecting portions of said passageways extending therebetween, said passageways having entry and exit portions extending from opposite ends of said headers to provide ingress and egress openings for said heat exchange medium, said headers defining an angle of at least 91° with respect to the direction of flow of said heat exchange medium wherein said headers are triangular shaped and are in substantially planar alignment at one of the boundary sides thereof with the longitudinal dimensions of said respective entry and exit portions. Said headers possess a plurality of parallel fluid channels communicating with said connecting portions, running in a direction substantially transverse thereto, and adapted to direct heat exchange fluid between said connecting portions and said respective entry and exit portions.

In the preferred embodiment, the panel of the present invention employs a uniquely shaped header provided with a plurality of parallel-directed, elongated bonded portions defining channels for directing fluid between said entry and exit portions and said connecting portions. The header employed in the present invention is so situated as to allow the greatest degree of capacity and depth in the area of greatest turbulence of fluid flow, while providing an ordered system of dispersing channels designed to apportion fluid flow to the respective connecting portions.

In addition to the above advantages, the headers employed in the panels of the present invention exhibit improved fluid flow control and directionality as well as increased header strength.

As indicated above, the preferred embodiment of the present invention utilizes a metal panel having a system of internal fluid passageways, conventionally painted black, as will be described in more detail hereinbelow. The concepts of the present invention may, however, also be advantageously utilized in heat exchangers generally, such as, for example, using extrusions. Since the concepts of the present invention are particularly advantageous in metal panels having a system of internal fluid passageways, the present invention will be specifically described hereinbelow utilizing this type of system.

Accordingly, it is a principal object of the present invention to provide a metal panel for use in heat exchange applications which enables the efficient and economical transfer of heat energy.

It is a further object of the present invention to provide a metal panel aforesaid which is particularly suited for use in a solar energy collector system.

It is yet a further object of the present invention to provide a metal panel as aforesaid which is efficiently designed to allow maximum utilization of internal passageway systems in a solar energy collector.

Further objects and advantages will become apparent to those skilled in the art as a detailed description proceeds with reference to the following drawings.

DETAILED DESCRIPTION

Figure 1:
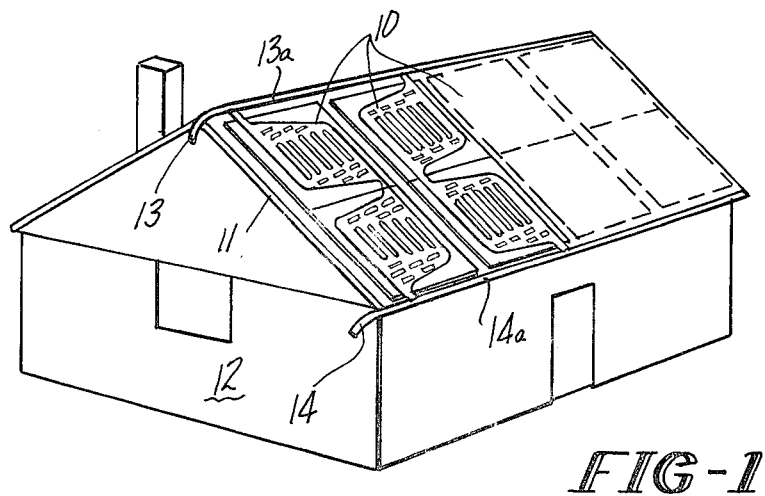
FIG. 1 is a diagram showing schematically the manner in which the panels of the present invention can be employed.

The panels of the present invention are preferably utilized in a solar heating system as shown in FIG. 1 wherein a plurality of panels of the present invention 10 are mounted on roof 11 of building 12 with conduits 13 and 14 connected in any convenient fashion to the equipment in the building, with the connections not shown. Thus, for example, cold water may go into conduit 13 from the building 12 by means of a conventional pump or the like. The water flows along common manifold 13a and is distributed into panels 10. The water flows through panels 10 is heated by means of solar energy, is collected in common manifold 14a, and flows into conduit 14. The heated water is then stored or utilized in a heat exchange system inside the building in a known manner. Naturally, if desired, the water flow may be reversed with the cold water entering via conduit 14 and collected via conduit 13. Alternatively, the solar heating unit of the present invention may be used or placed in any suitable environment, such as on the ground with suitable fasteners to prevent displacement by wind or gravity. The solar heating unit of the present invention may be used for residential heating purposes, such as in providing hot water in a residential environment. For example, three panels of the present invention having dimensions of 8 feet × 4 feet would efficiently supply an average household of four with hot water for home use. Alternatively, the solar panels of the present invention may be conveniently used for heating water for swimming pools or for preheating water for domestic gas or oil fired domestic hot water heaters. The fluid is preferably retained in a closed system with the water in the system heated in the solar unit and delivered into an insulated cistern or container so that the heated fluid may be stored up during sunshine for use on cool, cloudy days or at night when the heating of the fluid in the panel will not be of sufficient degree to provide the desired heat at the point of use.

A thermostat, not shown, is desirably installed at the top of the solar heater and this termostat may be set to turn on a circulating pump whenever the temperature reaches a predetermined reading. The pump will then pump the water through the system as generally outlined above.

Figure 2:
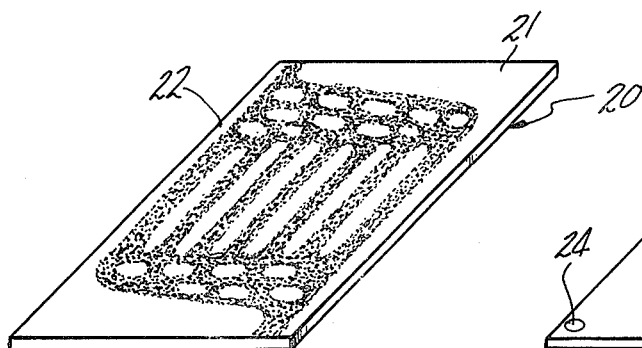
FIG. 2 is a perspective view of a sheet of metal having a pattern of weld-inhibiting material applied to a surface thereof.
Figure 3:
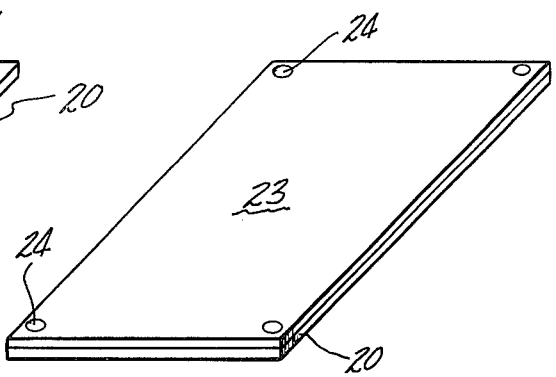
FIG. 3 is a perspective view of a composite metal blank wherein a second sheet of metal is superimposed on the sheet of metal shown in FIG. 2 with the pattern of weld-inhibiting material sandwiched therebetween.
Figure 4:
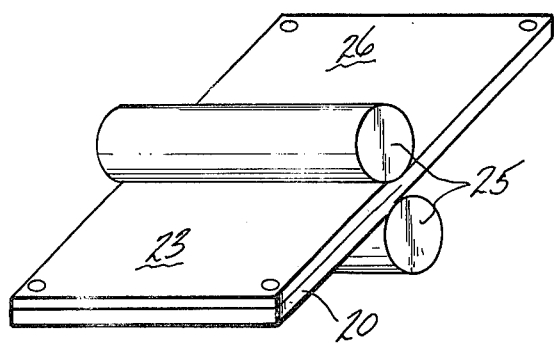
FIG. 4 is a schematic perspective view showing the sheets of FIG. 3 being welded together while passing through a pair of mill rolls.

As indicated above, the present invention contemplates a particularly preferred panel design for optimum efficiency in a solar heating system as described above. The metal panel or plate of the present invention is desirably fabricated by the ROLL-BOND ® process as shown in U.S. Pat. No. 2,690,002. FIG. 2 illustrates a single sheet of metal 20 as aluminum or copper or alloys thereof, having applied to a clean surface 21 thereof a pattern of weld-inhibiting material 22 corresponding to the ultimate desired passageway system. FIG. 3 shows the sheet 20 having superimposed thereon a second sheet 23 with a pattern of weld-inhibiting material 22 sandwiched between the units. The units 20 and 23 are tacked together as by support welds 24 to prevent relative movement between the sheets as they are subsequently welded together as shown in FIG. 4 by passing through a pair of mill rolls 25 to form welded blank 26. It is normally necessary that the sheets 20 and 23 be heated prior to passing through the mill rolls to assure that they weld to each other in keeping with techniques well known in the rolling art.

Figure 6:
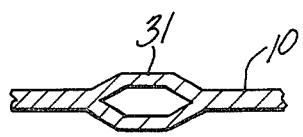
FIG. 6 is a sectional view taken along lines 6—6 of FIG. 5.
Figure 7:
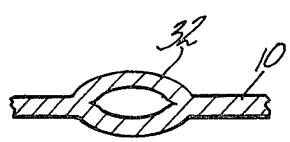
FIG. 7 is an alternate view showing a variation in the tube configuration similar to the view of FIG. 6.
Figure 5:
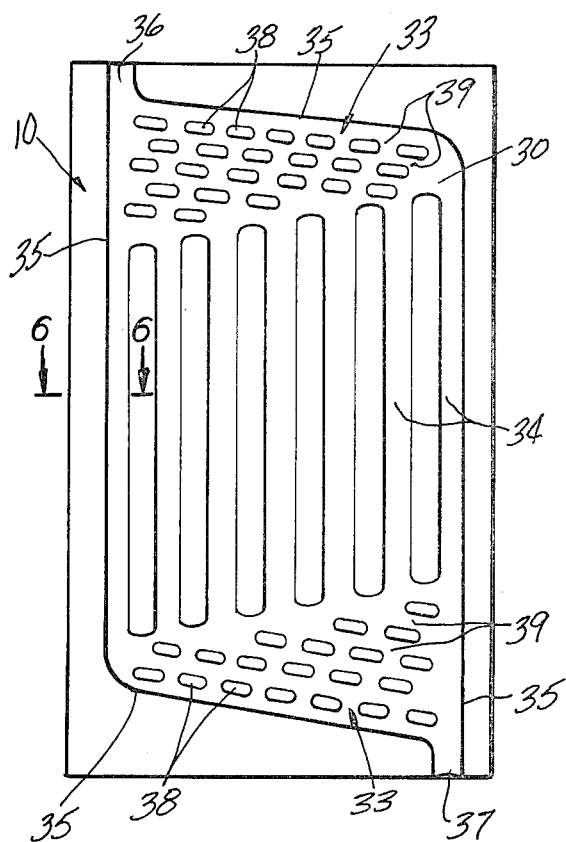
FIG. 5 is a top view showing the panel of the present invention having internal tubular passageways diposed between spaced apart portions of the thickness of the panel in the areas of the weld-inhibiting material.

The resultant blank 26 is characterized by the sheets 20 and 23 being welded together except at the area of the weld-inhibiting material 22. The blank 26 with the unjoined inner portion corresponding to the pattern of weld-inhibiting material 22 may then be softened in any appropriate manner as by annealing, and thereafter the blank may be cold rolled to provide a more even thickness and again annealed. The portions of the panel adjacent the weld-inhibiting material 22 are then inflated by the introduction of fluid distending pressure, such as with air or water, in a manner known in the art to form a system of internal tubular passageways 30 corresponding to the pattern of weld-inhibiting material as shown in FIG. 5. The passageways 30 extend internally within panel 10 and are disposed between spaced apart portions of the thickness of said panel. Thus, panel 10 comprises a hollow sheet metal panel or plate having a system of fluid passageways 30 for a heat exchange medium extending internally therein. If the passageways are inflated by the introduction of fluid distending pressure between flat die platens, the resultant passageways have a flat topped configuration 31 as shown in FIG. 6. If, on the other hand, passageways 30 are formed without the presence of superimposed platens the resultant passageway configuration has a semicircular shape 32 as shown in FIG. 7.

As shown in FIG. 5, the passageways 30 include opposed headers 33 connected by connecting portions 34 of said passageways extending substantially longitudinally in panel 10 between headers 33 and interconnecting same, with the opposed headers 33 extending in a direction substantially transverse to said longitudinal passageways. Preferably, opposed headers 33 are connected by a plurality of spaced, parallel individual connecting portions 34 of said passageways extending between the headers.

In accordance with the present invention, headers 33 are provided which are triangular in shape and are provided with boundary sides 35 which define a part of the outer perimeter of the passageways 30, as well as two of the three borders of the header structure.

Sides 35 are continuous with the fluid ports of the panel comprising entry portion 36 and exit portion 37, whereby the longitudinal dimension of at least one of respective sides 35 resides in substantially the same longitudinal plane as that containing the longitudinal dimension of the respective port. In the illustration of FIG. 5, the respective longitudinal dimensions of the sides and the entry and exit portions lie in the same longitudinal plane.

The advantage conferred by this arrangement is the availability of the greatest depth or capacity of header 33 is placed closest to the area of greatest turbulence and flow, that being the locus of entry and exit or heat exchange fluid. Thus, for example, fluid entering entry portion 36 in FIG. 5 encounters the greatest depth of header 33 as defined by vertically extending side 35 as illustrated therein. As panel 10 is generally employed in the upright position wherein the top edge or apex of the perimeter defined by sides 35 comprises the location of entry portion 36, the primary direction of flow is naturally dictated by gravity to be vertically downward by the most direct route. Thus, fluid entering at portion 36 tends to travel directly down through vertically adjacent connecting portions 34, and, as said connecting portions become filled, tends to spill over to laterally displaced parallel connecting portions.

Accordingly respecting the above, a further primary feature of the present invention resides in the provision of bonded portions 38 which are elongated in shape and which are aligned to define parallel-directed fluid channels 39 integral with said connecting portions and running substantially transverse thereto, which serve to assist in the lateral displacement of heat exchange fluid to respective connecting portions 34. Though the invention has been illustrated with bonded portions 38 comprising oblong or substantially rectangular shapes, it is to be understood that the invention is not limited thereto, as a wide variety of shapes may be employed which would provide the parallel channels 39 desired and employed herein.

The foregoing design can be seen to provide increased flow efficiency over designs providing the inlet and outlet structures at the regions of least depth of the headers. In the instance where flow is directed to the outlet portion, for example, the provision of the outlet at a shallow area of the header further serves to constrict and thereby impede the flow of heat exchange fluid. With the present invention, however, the area leading to outlet 37 is widened as the approach to said outlet is made, so as a greater quantity of fluid may be rapidly brought to said outlet.

Though the above discussion has proceeded with reference to solar panel structures employing connecting portions 34 running parallel to the longitudinal dimension of said panel, it can be seen that the invention is equally applicable to the instance where said connecting portions define angles of at least 1° with respect to said longitudinal dimension as determined by a longitudinal edge of the panel, such as disclosed in our copending application Ser. No. 632,502 commonly assigned and filed, the disclosure of which is incorporated herein by reference. As disclosed therein, the connecting portions define angles of at least 1° with respect to said fluid flow, said fluid flow indicated in FIG. 8 by phantom line 40 as passing in the direction of a longitudinal edge of panel 10'. Thus, the angle $\beta$ defined by line 40 and connecting portions 34', generally ranges from 20° to 10° and preferably from $2\frac{1}{2}$° to $7\frac{1}{2}$°. The foregoing angles may also be measured with respect to the central axis of the entry portion 36' which can be visualized as an extended straight line running through entry portion 36' in the direction of connecting portions 34'.

Figure 8:
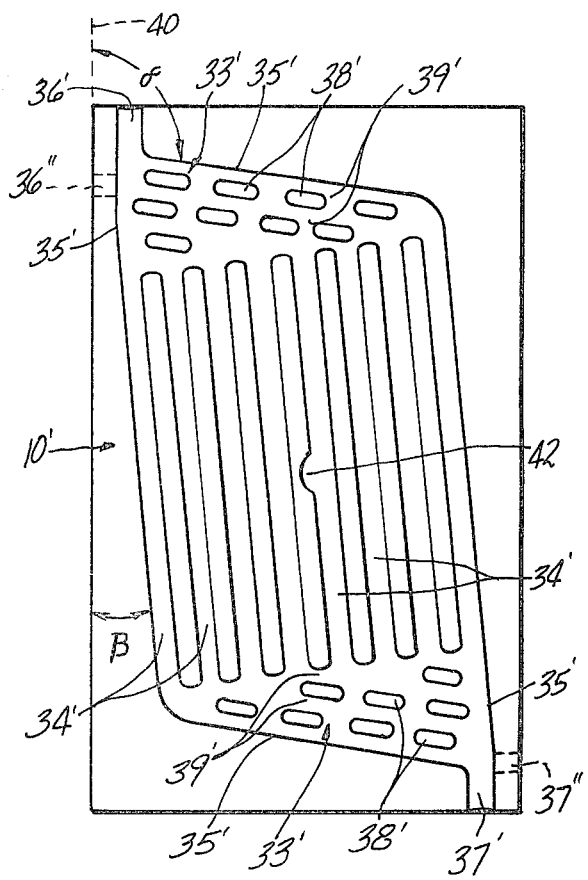
FIG. 8 is a top view showing an alternate embodiment of the present invention.

Referring further to FIG. 8, an angle $\alpha$ is described by phantom line 40 which is taken within the plane of panel 10', and boundary side 35' lying adjacent entry portion 36' which corresponds to at least 91° with respect to said direction of flow as defined by the central axis of said entry portion 36' and said exit portion 37', in accordance with parent application Ser. No. 573,953 noted earlier. In this embodiment, header 33' is provided with aligned, elongated bonded portions 38' which define parallel-directed passageways 39' in the manner discussed earlier. Also as indicated earlier, headers 33' are associated with respective portions 36' and 37' whereby the greatest depth of header 33' is provided adjacent the respective entry and exit portion. Likewise, the longitudinal dimensions of said exit and entry portions are in substantial planar alignment with the boundary sides 35' of respective headers 33'. In this embodiment, said alignment is not direct, as both boundary sides 35' are disposed at angles corresponding to those angles defined by connecting portions 34' and header 33', as defined with respect to the direction of fluid flow. Thus, the respective planes of said longitudinal dimensions will vary by an angle from 1° to 10°, said angle corresponding to the respective angles $\alpha$ and $\beta$ discussed above. In the illustration of FIG. 8 herein, entry portion and exit portion 36' and 37', respectively, are aligned with the longitudinal dimension of panel 10' defined by phantom line 40, the angle of variation between the respective planes will comprise the angle $\beta$ defined by connecting portions 34' and phantom line 40.

Figure 9:
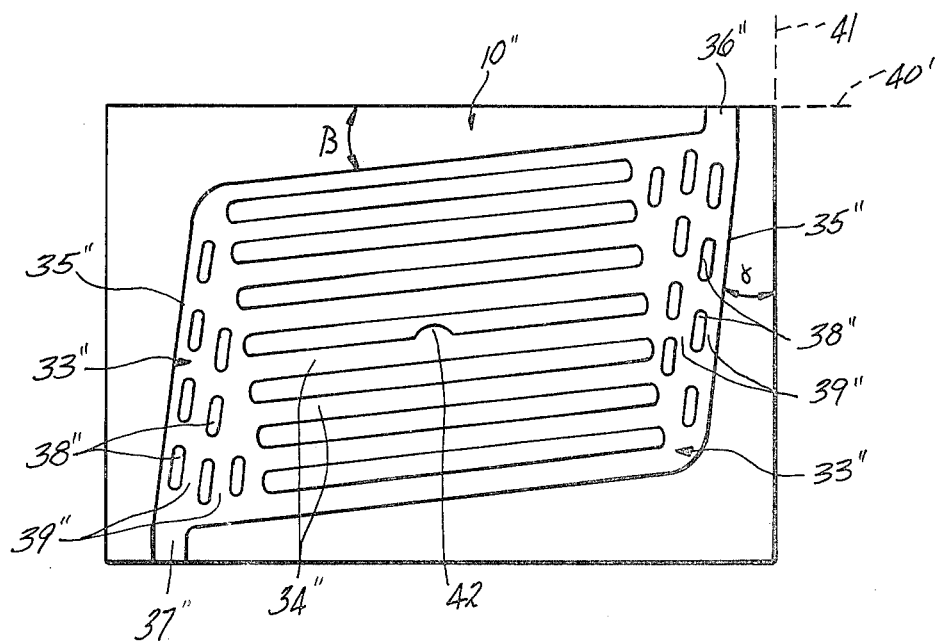
FIG. 9 shows the panel of FIG. 8 rotated 90° about an axis perpendicular to the plane of the panel.

If, however, said entry and exit portions are displaced 90° away from the directions of entry portion 36' and exit portion 37' as illustrated in phantom in FIG. 8 and in solid line form in FIG. 9, the angle of variation between the respective planes will nonetheless remain within the aforenoted range of values, as said angle is always determined in relation to a boundary side most closely corresponding in direction to that of the respective port. Thus, referring now to FIG. 9, entry portion 36" and exit portion 37" are shown in 90° removal from the plane of respective portions 36' and 37' in FIG. 8. Accordingly, the direction of flow is likewise displaced and is now represented by phantom line 41, and the angle defined by the divergence by the plane of line 41 and that of most closely aligned boundary side 35" ranges from 1° to 10°, and is depicted as the angle $\gamma$ in FIG. 9. In all of the above instances where angles have been defined with respect to lines representing the longitudinal definition of the respective panel, it is to be understood that said angles may be determined with respect to the convergence of the boundary side of the header with the central axis extrapolated through the entry or exit portion.

As in the illustration of FIG. 8, fluid flow is directed to the deepest portion of header 33" immediately upon entry through portion 36". Flow is assisted through connector portions 34" by the degree of inclination of said portions 34' denoted by the angle $\beta$. Fluid issuing from connector portions 34' is collected in header 33" situated in integral relation with exit portion 37". It is thus apparent from the foregoing illustrations that the provision of both angled headers and angled connecting portions facilitates the preparation and employment of the panels of the present invention which are suitable for mounting of the longitudinal dimension of the panel in either the horizontal or the vertical direction.

Referring back to FIGS. 8 and 9, an additional feature comprising the essence of our co-pending application Ser. No. 632,645, now U.S. Pat. No. 4,021,901 also commonly assigned and filed herewith, the disclosure of which is incorporated herein by reference, is discussed therein which comprises the provision of a nib-like marker structure 42 comprising in the present illustrations a distension of one of the respective connecting portions 34' and 34". Marker 42 enables the alignment of the inflated panel with a cutting means to either trim or sever said panel to the final dimensions thereof desired. Marker 42 is provided by the appropriate configuration of the pattern of weld-inhibiting material prior to the welding process.

Naturally, several alternative designs may be envisioned by one skilled in the art in accordance with the concepts described above.

This invention may be embodied in other forms or carried out in other ways without departing from the spirit or essential characteristics thereof. The present embodiment is therefore to be considered as in all respects illustrative and not restrictive, the scope of the invention being indicated by the appended claims, and all changes which come within the meaning and range of equivalency are intended to be embraced therein.

What is claimed is:

1. A heat exchange panel for use in a solar energy collector system possessing a system of internal tubular passageways defining opposed headers, said headers connected by a plurality of spaced parallel individual connecting portions of said passageways extending therebetween, said headers having entry and exit portions extending therefrom to opposed edges of said panel to provide ingress and egress openings for said heat exchange medium, each of said entry and said exit portions having a central axis, said headers possessing outer boundaries defining the perimeter thereof, at least one of said boundaries lying adjacent the apex of said perimeter defining an external angel of at least 91° with respect to the central axis of the most adjacent entry or exit portions, said angle taken in the plane containing said panel, wherein said headers are triangular in shape and possess a plurality of parallel fluid channels communicating with the connecting portions of said passageways and running in a direction substantially transverse thereto wherein said parallel channels are defined by a plurality of aligned bonded portions located within said headers assisting in the distribution of said heat exchange medium to the respective connecting portions and wherein said connecting portions are disposed at an angle of at least 1° with respect to an extended straight line of the central axis of the most adjacent exit or entry portion extrapolated through said more adjacent exit or entry portion.

2. The panel of claim 1 wherein said bonded portions are linearly elongated so as to appear substantially rectangular.

3. The panel of claim 1 wherein said entry and exit portions are parallel with said longitudinal edge.

4. The panel of claim 1 wherein said entry and exit portions are transverse to said longitudinal edge.

5. The panel of claim 1 wherein said connecting portions define an angle of from 2° to 10° with respect to said central axis.

6. The panel of claim 5 wherein said connecting portions define an angle of from $2\frac{1}{2}$° to $7\frac{1}{2}$° with respect to said central axis.

7. The panel of claim 1 wherein said headers are displaced with respect to fluid entry and exit portions extending therefrom whereby the respective longitudinal dimensions of said entry and exit portions and one of the sides defining the outer boundaries of said headers are parallel.

8. The panel of claim 7, wherein said entry and exit portions are parallel with a longitudinal edge of said panel.

9. The panel of claim 7 wherein the longitudinal dimensions of said respective entry and exit portions and the boundaries are disposed at an angle of from 2° to 10° with respect to each other.

10. The panel of claim 9 wherein said angle ranges from $2\frac{1}{2}$° to $7\frac{1}{2}$°.

11. The panel of claim 7 wherein said boundaries define an angle of from 92° to 100° with respect to the entry and exit portions, respectively, extending therefrom.

12. The panel of claim 11 wherein said boundaries define an angle of from $92\frac{1}{2}$° to $97\frac{1}{2}$° with respect to the central axis of the most adjacent exit or entry portion.

13. A heat exchange panel for use in a solar energy collector system possessing a system of internal tubular passageways defining opposed headers, said headers connected by a plurality of spaced parallel individual connecting portions of said passageways extending therebetween, said headers having entry and exit portions extending therefrom to opposed edges of said panel to provide ingress and egress openings for said heat exchange medium, each of said entry and said exit portions having a central axis, said headers' possessing outer boundaries defining the perimeter thereof, at least one of said boundaries lying adjacent the apex of said perimeter defining an external angle of at least 91° with respect to the central axis of the most adjacent entry or exit portions, said angle taken in the plane containing said panel,
- wherein said headers are triangular in shape and displaced with respect to fluid entry and exit portions therefrom such that the respective longitudinal dimensions of said portions and one of the sides defining the outer boundaries of said headers lie in substantially the same plane, and
- wherein said headers possess a plurality of aligned bonded portions located therein which define discrete, parallel-directed fluid channels communicating with said connecting portions and running in a direction substantially transverse thereto assisting in the distribution of said heat exchange medium to the respective connecting portions wherein said connecting portions are disposed at an angle of at least 1° with respect to an extended straight line of the central axis of the more adjacent exit or entry portion extrapolated through said most adjacent exit or entry portion.

* * * * *